United States Patent [19]
Stewart

[11] Patent Number: 6,009,994
[45] Date of Patent: Jan. 4, 2000

[54] MODULAR CONVEYOR SYSTEM

[75] Inventor: Brian G. Stewart, Howell, Mich.

[73] Assignee: Jervis B. Webb Company, Farmington Hills, Mich.

[21] Appl. No.: 08/995,004

[22] Filed: Dec. 19, 1997

Related U.S. Application Data

[60] Provisional application No. 60/033,791, Dec. 30, 1996.

[51] Int. Cl.[7] .................................................. B65G 13/07
[52] U.S. Cl. ............................................ 198/790; 198/583
[58] Field of Search .................................. 298/583, 780, 298/790

[56] References Cited

U.S. PATENT DOCUMENTS

| | | |
|---|---|---|
| 1,540,560 | 6/1925 | Nelson . |
| 2,873,011 | 2/1959 | Canning . |
| 3,361,248 | 1/1968 | Daymon . |
| 4,146,126 | 3/1979 | Mattos . |
| 4,361,224 | 11/1982 | Bowman ............... 198/790 X |
| 4,492,297 | 1/1985 | Sticht . |
| 4,671,402 | 6/1987 | Inoue . |
| 5,096,045 | 3/1992 | Feldl . |
| 5,131,531 | 7/1992 | Chambers . |
| 5,224,584 | 7/1993 | Best et al. . |

FOREIGN PATENT DOCUMENTS

| | | |
|---|---|---|
| 0131767 | 1/1985 | European Pat. Off. . |
| 2 648 118 | 12/1990 | France . |
| 2263176 | 3/1974 | Germany . |
| 427695 | 10/1965 | Switzerland . |

*Primary Examiner*—William E. Terrell
*Assistant Examiner*—Gene O. Crawford
*Attorney, Agent, or Firm*—Dickinson Wright PLLC

[57] ABSTRACT

A modular conveyor system is disclosed which includes a plurality of non-contiguous, freestanding pedestals, arranged in two parallel rows. Each of the pedestals includes a support roller for contacting the bottom surface of a pallet placed on top of it, and the support rollers are connected to one another and to a drive by a series of belts. The system can easily be modified to accommodate loads of different widths, lengths and weights by moving the pedestals to correspond to the dimensions of the new load.

26 Claims, 4 Drawing Sheets

MODULAR CONVEYOR SYSTEM

This application is a continuation-in-part of provisional application No. 60/033,791 filed Dec. 30, 1996.

The present invention is directed to a modular conveyor system, and more specifically, to a modular conveyor system for conveying pallets that is adjustable for use with pallets of different lengths, widths and weights.

BACKGROUND OF THE INVENTION

Conveyor systems are generally designed for specific applications wherein certain types of objects are moved between various points at various rates. These systems are often installed permanently in a facility, and perform the tasks for which they are designed quite well. However, such systems are not easy to modify. Therefore, if the manufacturing process or the type of material being conveyed changes, it may be necessary to remove the entire conveyor system or significant portions thereof and to replace it with a conveyor system specifically designed for the new task.

The need to modify a conveyor system arises particularly often in connection with conveyors for moving pallets. These pallets come in a variety of lengths and widths and can be loaded with different amounts of material. The size of a pallet is based on factors that are difficult to control, and therefore, it is difficult to standardize the pallet size. It is thus preferable to provide a conveyor system for handling different sizes of pallet rather than attempting to standardize the pallet size itself. However, designing a system that can accommodate the heaviest pallets that might be encountered requires the use of resources that are not necessary for conveying lighter loads. Likewise, it is difficult to adjust the width of a conveyor. Attempts to accommodate all types of pallet with one conveyor are generally not cost effective and do not work as well as a system that is configured to handle a particular type of pallet and load.

In order to overcome such problems, various modular conveyor systems have been proposed. Many of these modular systems comprise a number of conveyor segments which can be connected together to form a conveyor system. To use these systems, a number of different parts must be kept on hand or ordered each time a modification to the system is required. Furthermore, any time a length of conveyor is needed which can not be formed from a given number of segments, custom-made segments must be obtained. Segments removed from a system must be stored or discarded, and after several modifications, this can become quite expensive. Furthermore, none of these prior art systems allow the width of the conveyor system to be changed. Several of these systems are shown in the following United States Patents.

U.S. Pat. No. 4,146,126 to Mattos shows a modular conveyor system which includes a number of vertical supports connected together by support beams and side rails. In order to change the length of this conveyor it is necessary to remove the support beam and side rails and to replace them with new beams and rails of a suitable length. While this system may be easier to disassemble than previous systems, a change in configuration still requires the removal of large portions of the system and the replacement of this portion with new and possibly custom-made components. This system can not be rearranged easily, and to do so old parts must be discarded and new ones purchased or made.

U.S. Pat. No 5,096,045 to Feldl shows a portable conveyor system that suffers from the same shortcomings as the Mattos system described above. The Feldl conveyor includes a number of different sections, and sections can be added or removed to change the length of the conveyor, but specially made segments are still necessary in order to control the exact length of the conveyor. Furthermore, a segment once removed, must be discarded or stored, and the width of this conveyor cannot be changed.

U.S. Pat. No 5,131,531 to Chambers shows another modular conveyor having a number of bolted-together track segments. Like the above references, the length of the system can only be changed in increments of the length of one of the modules, and the width of the system is not adjustable.

None of the above conveyor systems have adjustable widths, and all are limited to a certain number of lengths and arrangements due to the fixed length of each segment in the system. Likewise, each of the segments is designed to support a certain maximum load and cannot be easily adjusted to accommodate heavier or lighter loads. It would therefore be desirable to provide a modular conveyor system wherein the width of the system can be changed as easily as the length, which can be formed in virtually any length without the need for custom parts, and which can quickly and easily be changed from one configuration to another.

SUMMARY OF THE INVENTION

These problems are addressed by the present invention which comprises a modular conveyor system including a number of freestanding pedestals for supporting a load, such as a palletized load, which pedestals can be arranged in a wide variety of ways to accommodate loads of different widths, lengths and weights. In the preferred embodiment, these pedestals comprise a support structure for holding a rotatable support shaft in a horizontal plane normal the direction of load travel. The pedestals are arranged in pairs in two parallel rows with the shafts of each pair of pedestals aligned with each other. Each of the shafts includes a support roller connected to the shaft for rotation along with the shaft, and this support roller contacts the underside of each pallet as it travels down the conveyor. Guide wheels are connected to the outer ends of these shafts for engaging belts or chains for driving the shafts. One pair of shafts is connected to a drive and the remaining drives are connected to one another by additional belts or chains so that the rotation of one pair of shafts by a drive is transmitted to all of the other shafts that are interconnected by belts. Additional pedestals which are not connected to drive belts can also be inserted in the system to support heavier loads without the need to otherwise alter the system. Belt take ups may also be used to give greater control over the spacing between the pedestals.

In order to change the width of this system to accommodate a wider load, it is merely necessary to move one of the rows of pedestals toward or away from the other to produce a conveyor of a given width. The pedestals are preferably freestanding and stable, and if they are connected to the ground, it is with easily removable pins which can be pulled by hand to allow a particular pedestal to be repositioned. To accommodate shorter pallets, additional pedestals are inserted into the conveyor system and connected to the drive belts so that the spacing between the pedestals is substantially less than the length of each pallet. To accommodate heavier pallets, additional powered pedestals may be added as described above. Alternately, or in addition, pedestals that are not connected to drive belts may be inserted into the system to better support the weight of a load without requiring the rearrangement of the drive belts. The pedestals are all substantially the same, and thus the entire system can be assembled from a relatively small number of component types. And, unlike in the prior art systems, the length and width of the system are practically infinitely adjustable using only this limited number of standard components.

It is therefore a principal object of the present invention to provide a modular conveyor system.

It is another object of the present invention provide an adjustable width conveyor system.

It is a further object of the present invention to provide an adjustable length conveyor system.

It is yet another object of the present invention to provide a modular conveyor system which comprises a limited number of elements.

It is yet a further object of the present invention to provide a conveyor system for conveying palletized loads which can be adjusted to accommodate pallets of different widths, lengths, and weights.

It is still another object of the present invention to provide a modular conveyor system wherein all of the modules are driven from a single drive.

It is another object of the present invention to provide a modular conveyor system comprising a number of free-standing pedestals for supporting and moving a load.

It is a further object of the present invention to provide a modular conveyor system comprising a number of noncontiguous modules connected together by drive belts.

It is yet another object of the present invention to provide a modular conveyor system for conveying pallets and palletized loads which includes both driven and non-driven modules.

BRIEF DESCRIPTION OF THE DRAWINGS

These and other objects of the invention will become apparent from a reading and understanding of the following detailed description of the preferred embodiments of the invention together with the following drawings of which.

DETAILED DESCRIPTION OF THE PREFERRED EMBODIMENTS

Figures 1, 2:
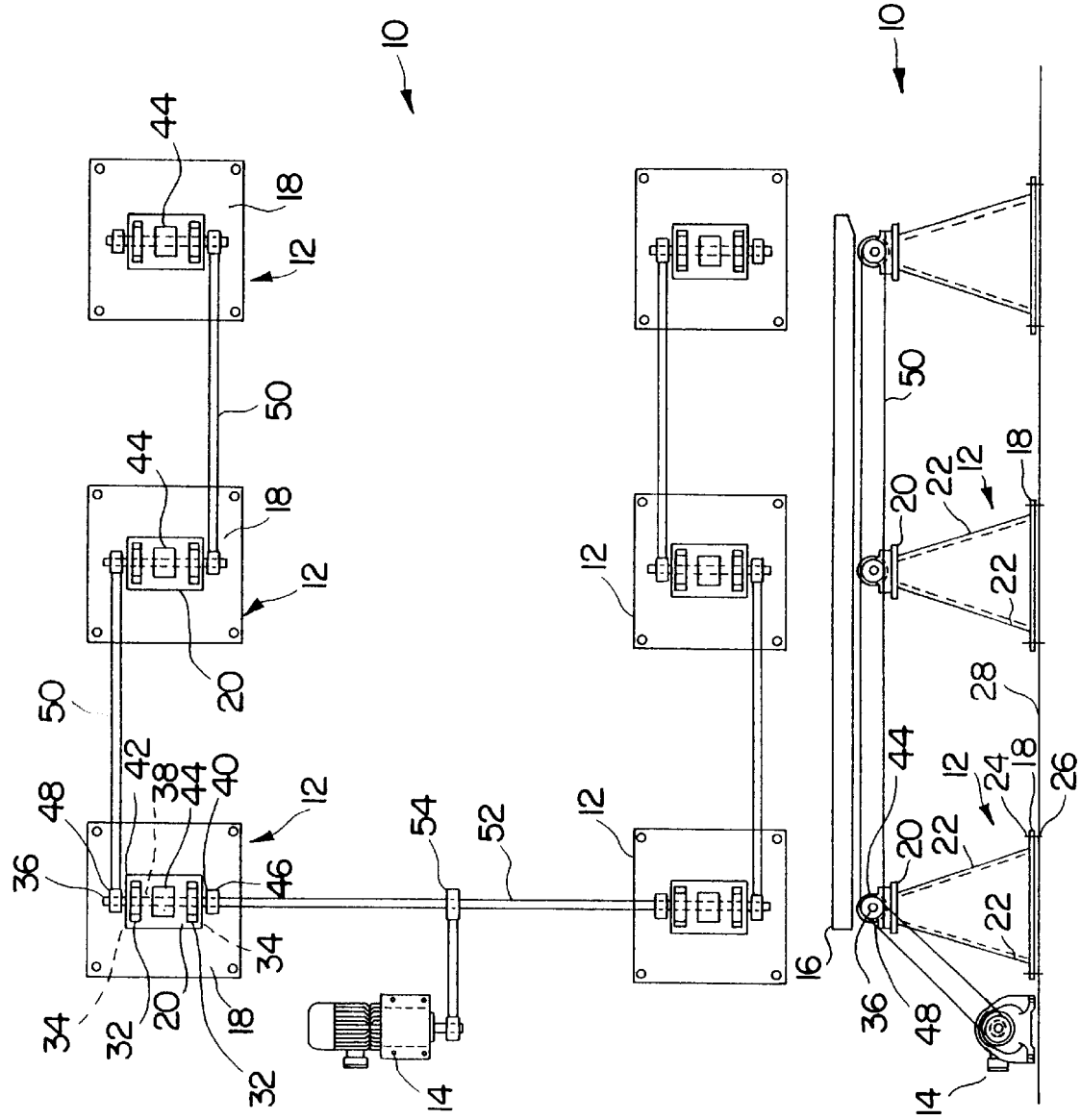
FIG. 1 is a top plan view of a modular conveyor system according to the present invention.
FIG. 2 is a side elevational view of the conveyor system shown in FIG. 1.
Figure 3:
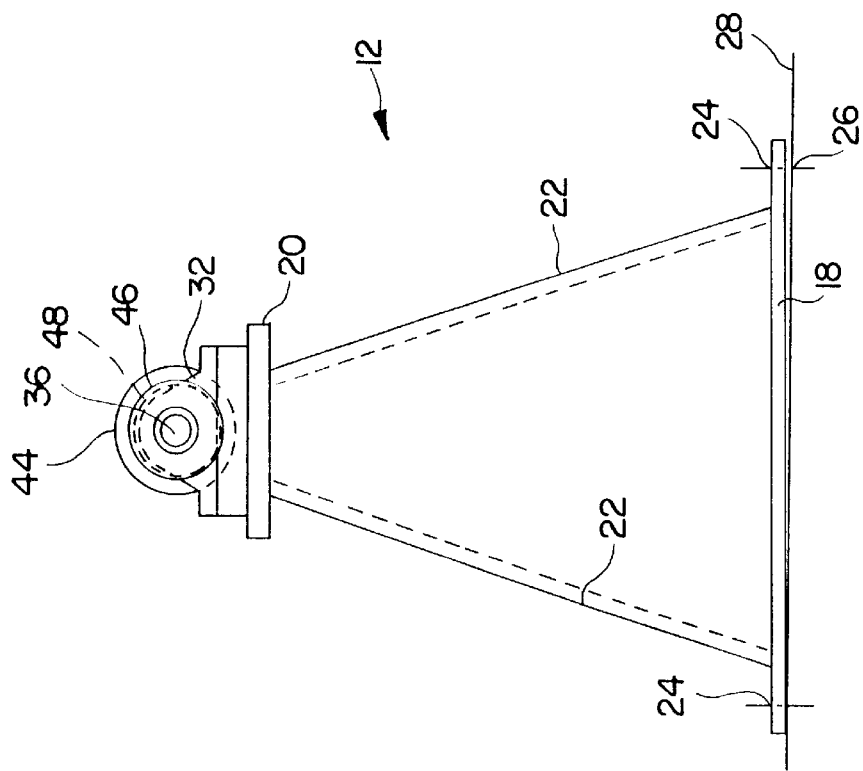
FIG. 3 is a front elevational view of one of the pedestals shown in FIGS. 1 and 2.
Figure 4:
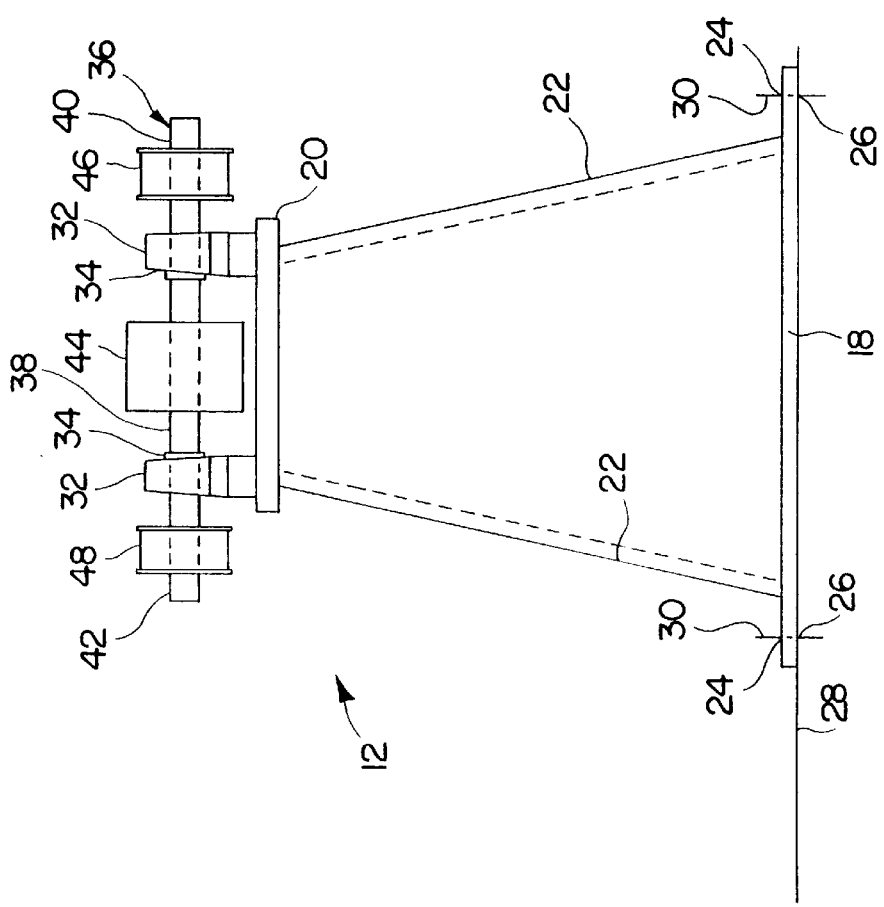
FIG. 4 is a side elevational view of the pedestal of FIG. 3.

Referring now to the drawings, wherein the showings are for purposes of illustrating several preferred embodiments of the subject invention only and not for purposes of limiting same, FIGS. 1 and 2 show a modular conveyor system designated generally by the numeral 10 comprising a number of modules or pedestals 12 connected to a drive motor 14 and to each other for conveying a pallet 16 in a given direction. As best seen in FIGS. 3 and 4, each pedestal 12 comprises a base plate 18, a top plate 20 and a pair of angled supports 22 connecting top plate 20 to base plate 18. Base plate 18 also includes a number of holes 24 which are alignable with holes 26 in floor 28 upon which the pedestals rest, and several pins 30 are inserted through holes 24 into holes 28 in order to prevent the pedestals from sliding relative to the floor. A pair of bosses 32 extend upwardly from top plate 20 and include aligned journal bearings 34 for rotatably supporting a shaft 36. Shaft 36 includes a central portion 38 located between bosses 32 and inner and outer end portions 40 and 42 respectively, which extend away from bosses 32 and central portion 38. These end portions are identical, and the terms "inner" and "outer" merely identify whether the end portion is facing toward or away from the center of the conveyor. A support wheel 44 is connected to central portion 38 of shaft 36 for rotation therewith and for engaging a pallet 16 as it passes thereover. An inner flanged belt wheel 46 is connected to inner end portion 40 and an identical outer flanged wheel 48 is connected to outer end 42 of the shaft to allow the shaft to be rotated by connection to a belt.

Each inner flanged wheel 46 is connected to the inner flanged wheel 46 of an adjacent pedestal 12 and each outer flanged wheel 48 is likewise connected to the next adjacent outer flanged wheel 48 by belts 50. The exception to this arrangement is the set of pedestals which are connected to the drive. These pedestals will have their inner drive wheels connected to the drive via a drive shaft or other arrangement instead of to another pedestal. Additionally, while belts are used in the preferred embodiments, it should be understood that chains and sprockets or similar elements could be used to connect the various shafts without exceeding the scope of this invention. As can be seen in FIG. 1, the belts in a given row of pedestals are connected alternately to the inner and outer belt wheels. In other words, one belt is connected between the outer wheel of a first pedestal shaft and the outer wheel of a second pedestal shaft, a second belt is connected between the inner wheel of the second shaft and the inner wheel of a third pedestal shaft, etc. Only a portion of a conveyor system is shown in the drawings. Most systems will have far more than three pairs of pedestals.

A drive shaft 52 is connected between the inner end portions 40 of two shafts, one from each row of pedestals, and this drive shaft includes a belt wheel 54 for connection to drive motor 14. As will be appreciated from the drawings and the foregoing description, because the shafts on all of the pedestals are interconnected, and one pair of these shafts is connected to drive 14, operating drive 14 causes all of the shafts 36 and support wheels 44 in the system to rotate in the same direction. A pallet placed onto these rotating support wheels will then be conveyed along the conveyor in a given direction.

Figure 6:
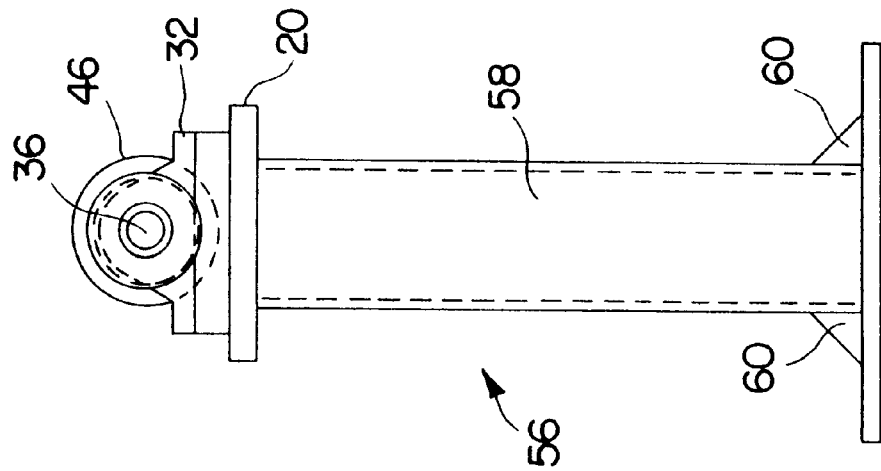
FIG. 6 is a side elevational view of the pedestal of FIG. 5.
Figure 5:
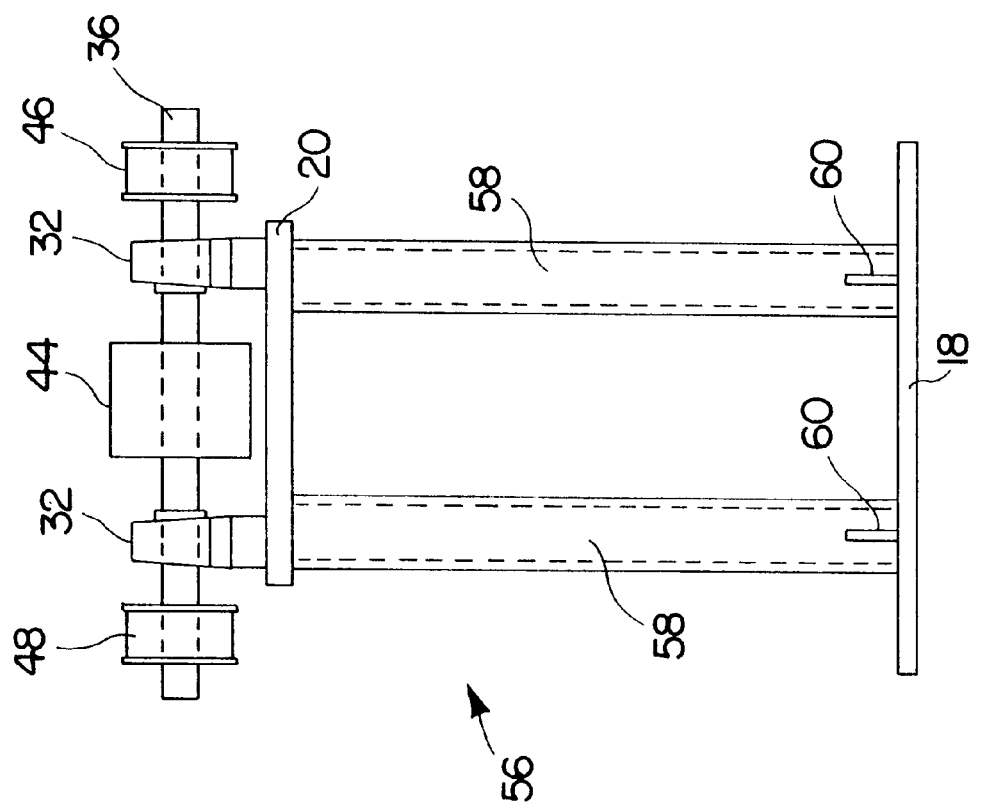
FIG. 5 is a front elevational view of an alternate pedestal for use in connection with the subject system.

FIGS. 5 and 6 show an alternate type of pedestal 56 which can be used with the present conveyor system. These pedestals are substantially similar to the pedestals 12 described above, and the same numerals are used to identify features of pedestals 56 that are also found on pedestals 12. Pedestals 56 include supports 58 which are substantially vertical and are secured in this vertical orientation with braces 60 connected between the supports and base plate 18. This second type of pedestal is narrower than pedestal 12 and thus pedestals 56 can be placed closer together than can pedestals 12. This may be desirable when close spacing of pedestals is made necessary by the weight of objects being conveyed.

Figure 7:
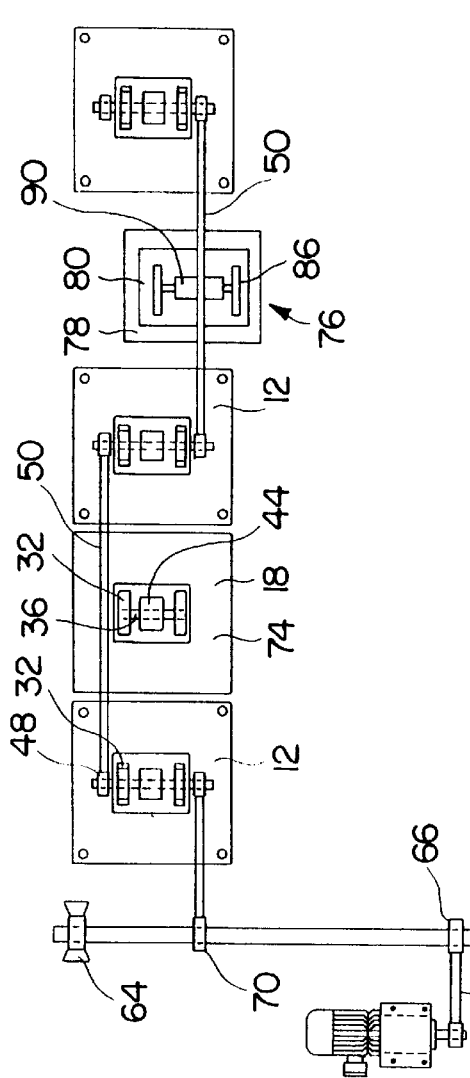
FIG. 7 is a top plan view of a second embodiment of the subject invention which includes non-driven pedestals, a belt length adjustment mechanism, and an alternate drive mechanism; and, FIG. 8 is a side elevational view of the embodiment shown in FIG. 7.
Figure 8:
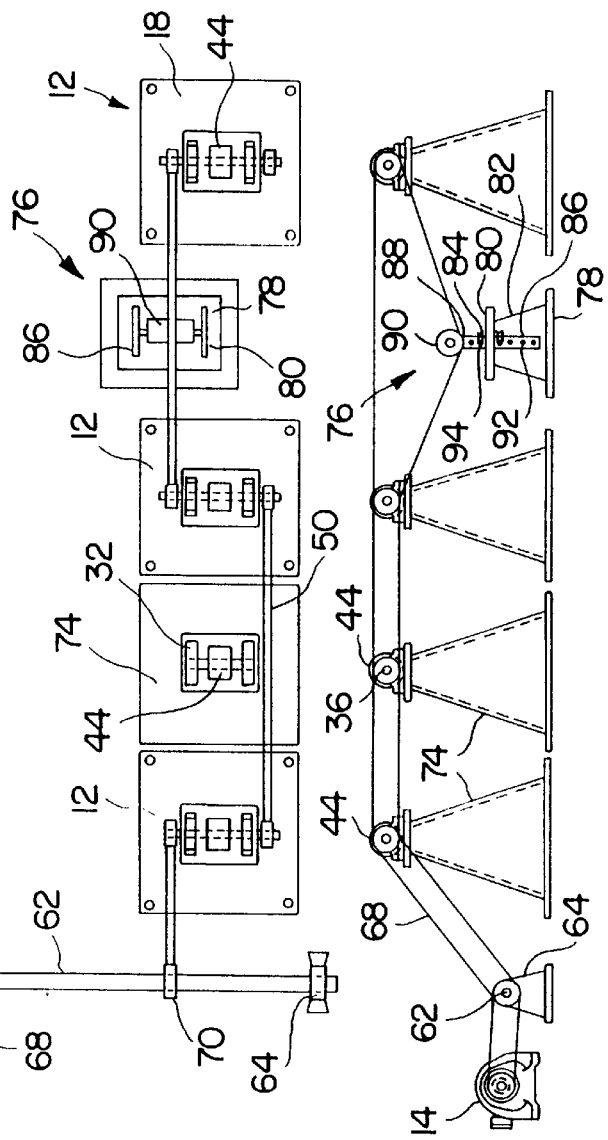

FIGS. 7 and 8 show a second embodiment of the present invention which includes a number of features in addition to those found in the first embodiment. Not all of these features will be needed in any given application and some features may be omitted when not needed. Many of the elements of the first embodiment are also present in the second embodiment and the same reference numerals are used to identify these elements in both embodiments.

First, a different arrangement is used to connect drive 14 to the pedestal shafts 36. A drive shaft 62 is rotatably supported by a pair of supports 64 mounted on the ground between drive 14 and a pair of pedestals 12. Drive shaft 62 includes a belt wheel 66 which is connected to drive 14 by a belt 68 and rotates when the drive is engaged. Shaft 62 includes two additional belt wheels 70 which are movable relative to shaft 62 and which are affixed thereto by set screws or other suitable means (not shown). Wheels 70 are positioned on shaft 62 such that they are aligned with two of the inner belt wheels 46 on support shafts 36 and connected to the inner belt wheels by drive belts 72. Using this arrangement, when the two rows of pedestals 12 are moved further apart to accommodate a wider pallet, wheels 70 can also be moved further apart to allow inner wheels 46 to be connected to drive shaft 62.

Next, FIGS. 7 and 8 show the use of a pair of non-driven pedestals 74 located between a pair of driven pedestals 12. The driven pedestals 12 are connected to one another and to drive 14 by a series of belts and belt wheels. Non-driven pedestals 74 are substantially identical to pedestals 12 except that support shafts 36 do not include inner belt wheels 46 or outer belt wheels 48 and are not connected to the other pedestals in the system. Shaft 36 is preferably shorter on these non-driven pedestals and does not extend outwardly beyond bosses 32; however, a non-driven pedestal 74 can also be formed by removing the inner and outer belt wheels from shaft 36 of one of the driven pedestals 12. When this is done, the ends of shaft 36 will extend outwardly past belts 50, but because the wheels are not present, the shaft will not engage or otherwise interfere with the movement of the belts. Non-driven pedestals 74 are used to support heavy loads, especially on a temporary basis. If it becomes necessary to convey an unusually heavy load on a given conveyor system, rather than rearrange the pedestals in the system by placing them closer together, non-driven supports can be placed as necessary to better handle the weight. Because these pedestals 74 are not connected to the other pedestals or to any other part of the system, they can be placed and removed in less time than it would take to reconfigure the whole system.

FIG. 7 and 8 also show a belt take up module 76. As will be appreciated from the foregoing description, pedestals 12 can be spaced apart by various distances, but this requires that belts of different lengths be used each time the spacing is changed. While this is possible, especially if the spacing is changed in fixed increments, it is preferable to be able to adjust the spacing over a continuous range. Thus a belt take up 76 is used. Take up 76 comprises a base plate 78, a top plate 80 and a pair of supports 82. Top plate 80 includes a pair of openings 84 for receiving the legs 86 of a roller support 88. A roller 90 is supported on support 88 for rotation thereabout. Legs 86 further include a plurality of holes 92 through which pins 94 are inserted to fix legs 86 with respect to top plate 80. Support 88 is placed over the lower portion of one of the belts 50 with roller 90 resting on the belt and the legs 86 are lowered through holes 92 until the belt tension reaches a desired level. Pins 94 are then inserted through the openings above and below top plate 80 to hold the legs in place. In this manner, belts of only a few different lengths can be used to connect pedestals that are separated by a wide variety of distances. Of course, other belt take up mechanisms are well known in the art and could be used in connection with or instead of take up 76 described above. Such take ups could even be built into pedestals 12 if desired.

To set up the subject conveyor system, the length and width of the pallet to be conveyed must be known as must the weight of the heaviest pallet and load combination that is to be transported on a given configuration of the system. The driven pedestals 12 are then arranged in two parallel rows with the spacing between the outer edges of support wheels 44 equal to the width of the pallet being conveyed. The support wheels 44 in each row are spaced apart by a distance of less than or equal to one third of the length of the pallets to be conveyed so that a given pallet is always in contact with at least two pairs of support wheels as it travels along the conveyor. For example, to convey pallets that are nine feet long and five feet wide, the rows of pedestals 12 should be spaced apart a distance of five feet and the pedestals in support wheels 44 of the pedestals in each row should be spaced apart a distance of three feet Pins 30 are then inserted through the holes 24 in the base plates 18 and into the ground to hold the pedestals in place. If needed, take ups 76 are placed between the pedestals to remove slack from the belts being used. Drive motor 14 is connected to a pair of support shafts 36 in one of the ways described above and the drive is started to cause the shafts 36 to rotate in unison. A pallet is then placed onto support rollers 36 and transported along the conveyor. Various loading stations and equipment for interacting with the load can also be incorporated into or placed adjacent to the conveyor line.

The subject invention has been described in terms of two preferred embodiments; however many obvious additions and modifications to the subject system will become apparent to those skilled in the relevant art upon a reading and understanding of the foregoing specification. For example, different or even multiple drives could be used to power this system, and the supports could be constructed in different ways. Likewise, chains or similar devices could be used to interconnect the various shafts in the invention. Also, the support rollers 36 could be replaced with other mechanisms, such as small belt conveyors mounted on each pedestal, if it was found desirable to keep a larger surface area in contact with the pallet as it passes over a pedestal. All of these modifications are intended to be included within the scope of this invention to the extent that they are described by the several claims appended hereto.

I claim:

1. A modular conveyor system comprising:
   a plurality of noncontiguous modules comprising a pedestal and a support shaft rotatably connected to said pedestal, said noncontiguous modules arrange in at least one row, each pedestal being freestanding and spaced apart from adjacent pedestals;
   a drive;
   connectors for operatively connecting said drive to at least one of said support shafts; and,
   a plurality of belts for interconnecting a plurality of support shafts in each said row.

2. A system according to claim 1 wherein said modules are arranged in at least two spaced-apart rows.

3. The system of claim 1, wherein each pedestal is movable to account for loads having varying conditions.

4. A system according to claim 1 wherein each of said at least one row of pedestals comprises a head pedestal, a tail pedestal and at least one middle pedestal and wherein each of said at least one middle pedestals is connected to two other pedestals by said belts.

5. A system according to claim 4 wherein said head pedestal support shafts are operatively connected to said drive by at least one drive belt.

6. A system according to claim 1 wherein each support shaft includes at least one belt wheel for guiding one of said plurality of belts.

7. A system according to claim 6 wherein said support shaft includes a load supporting roller fixedly connected to said support shaft for rotation therewith.

8. A system according to claim 7 wherein the outer diameter of said load supporting roller is greater than the outer diameter of said belt wheel.

9. A modular conveyor system comprising:
   a plurality of noncontiguous modules comprising a pedestal and a support shaft rotatable connected to said pedestal, said pedestals arranged in at least two rows, each row comprising a head pedestal, a tail pedestal and at least one middle pedestal, each middle pedestal connected to two other pedestals by said belts;
   a drive;
   connectors for operatively connecting said drive to at least one of said support shafts; and,
   a plurality of belts for interconnecting a plurality of support shafts in each said row;
   each said head pedestal operatively connected to said drive by at least one drive belt, support shafts of said head pedestals connected together by a cross shaft.

10. A system according to claim 9 wherein said at least one belt wheel comprises two belt wheels and wherein said two belt wheels are located on opposite sides of said load supporting roller.

11. A method for conveying a load comprising the steps of:
   providing a plurality of freestanding pedestals including support shafts, each freestanding pedestal spaced apart from adjacent freestanding pedestals;
   arranging said freestanding pedestals in first and second parallel rows;
   providing a drive;
   connecting each of said support shafts to either said drive or another of said support shafts;
   placing the load onto said support shafts; and,
   operating said drive to turn said shafts to convey said load.

12. The method of claim 11, wherein each freestanding pedestal is movable to account for loads having conditions.

13. The method of claim 11 wherein each of said support shafts includes a support roller.

14. The method of claim 13 wherein the step of arranging said pedestals in two parallel rows includes the step of aligning the support shafts of the pedestals in the first row with the support shafts of the pedestals in the second row.

15. The method of claim 14 including the steps of providing a connector shaft and connecting the support shaft of a pedestal in the first row to the support shaft of a pedestal in the second row.

16. A freestanding conveyor pedestal for use in a conveyor system comprising:
   a top plate member;
   first and second supports for supporting said top plate member;
   first and second bosses extending from said top plate;
   an axle rotatably supported in said first and second bosses; and,
   a support wheel connected to said axle for rotation therewith and positioned between said bosses.

17. A pedestal according to claim 16 wherein said bosses each have a top surface located a given distance above said top plate member and wherein at least a portion of said support wheel is spaced apart from said top plate member a distance greater than said given distance.

18. A pedestal according to claim 16 wherein said axle comprises a central portion located between said first and second bosses and first and second end portions extending away from said bosses and said central portion.

19. A pedestal according to claim 18 wherein said end portions each include a drum member for connecting said axle to a drive belt.

20. A pedestal according to claim 19 wherein the diameter of said support wheel is greater than the diameter of said drum members.

21. An adjustable-width conveyor system for conveying a load comprising:
   a plurality of driven conveyor supports comprising first and second head supports, first and second tail supports, and a plurality of intermediate supports, wherein each of said driven conveyor supports includes a rotatable axle and a movable driving surface, each of said driven conveyor supports being freestanding, spaced from adjacent driven conveyor supports, and movable in a width direction with respect to a path of conveyance of said load to account for loads of varying widths;
   a drive motor operatively connected to at least one of said axles for moving the driving surface of said at least one axle; and,
   a plurality of belts for connecting the rotatable axle of each of said driven supports to the rotatable axle of at least one other driven support.

22. An adjustable-width conveyor system for conveying a load comprising:
   a plurality of driven conveyor supports comprising first and second head supports, first and second tail supports, and a plurality of intermediate supports, wherein each of said driven conveyor supports includes a rotatable axle and a movable driving surface;
   a drive motor operatively connected to at least one of said axles for moving the driving surface of said at least one axle; and,
   a plurality of belts for connecting the rotatable axle of each of said driven supports to the rotatable axle of at least one other driven support said conveyor system including at least one non-driven conveyor support comprising a rotatable axle for supporting a load.

23. The conveyor system of claim 22 including take-up means for adjusting the length of the belt between adjacent rotatable axles.

24. The conveyor of claim 22 wherein said driven support rotatable axle is longer than said non-driven support rotatable axle.

25. A modular conveyor system for conveying pallets comprising:
   a plurality of noncontiguous freestanding pedestals arranged in at least two spaced-apart rows, each of said pedestals including:
   a top plate member;
   a bottom plate member;
   first and second supports for supporting said top plate member on said bottom plate member;
   first and second bosses extending from said top plate;

an axle rotatably supported in said first and second bosses having a central portion located between said first and second bosses and end portions extending away from said bosses and said central portion;

a support wheel connected to said central portion of said axle for rotation therewith; and, first and second belt wheels connected to said end portions for rotation therewith;

a drive including a drive shaft;

connectors for operatively connecting said drive shaft to at least one of said axles; and, a plurality of belts for connecting the belt wheel of each support axle to the belt wheel of an adjacent support axle in the same row.

26. The system of claim 25 including at least one pedestal not connected to another pedestal.

* * * * *